(12) United States Patent
Li et al.

(10) Patent No.: US 11,828,324 B1
(45) Date of Patent: Nov. 28, 2023

(54) QUICK-DETACHABLE CONNECTING DEVICE WITH SIMPLIFIED THREAD STRUCTURE AND CONNECTION METHOD USING SAME

(71) Applicant: Sichuan University, Chengdu (CN)

(72) Inventors: Wenqiang Li, Chengdu (CN); Yingdong Liu, Chengdu (CN); Hai Xiang, Chengdu (CN); Jiahao Chen, Chengdu (CN); Yingxin Zhao, Chengdu (CN); Jiawei Wang, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 18/455,542

(22) Filed: Aug. 24, 2023

(30) Foreign Application Priority Data

Sep. 27, 2022 (CN) .......................... 202211182680.4

(51) Int. Cl.
*F16J 1/16* (2006.01)
*F16B 7/18* (2006.01)
*G21C 19/02* (2006.01)

(52) U.S. Cl.
CPC .............. *F16B 7/182* (2013.01); *G21C 19/02* (2013.01)

(58) Field of Classification Search
CPC ........ F16J 1/16; F16J 1/18; B22F 3/06; G21C 3/30; G21C 3/32; G21C 3/33; G21C 3/12; F16L 5/04; F16L 5/10
See application file for complete search history.

(56) References Cited

U.S. PATENT DOCUMENTS

2006/0082139 A1    4/2006  Jensen

FOREIGN PATENT DOCUMENTS

| CN | 101727993 A | 6/2010 |
|----|----|----|
| CN | 101882474 A | 11/2010 |
| CN | 107068208 A | 8/2017 |
| CN | 107610785 A * | 1/2018 |
| CN | 107610785 A | 1/2018 |
| CN | 108198636 A | 6/2018 |
| CN | 114084037 A | 2/2022 |
| EP | 2516288 A1 | 10/2012 |

(Continued)

OTHER PUBLICATIONS

Xindong Huang et al., "Research and Development of a New Speediness Disassembly Tie-In for Advanced Fuel Assembly", Nuclear Power Engineering, vol. 34, No. 4, Aug. 2013, pp. 157-160.

(Continued)

*Primary Examiner* — Daniel J Wiley (57) ABSTRACT

A quick-detachable connecting device with a simplified thread structure includes a top nozzle, a connecting tube sleeve, a locking tube and a locking piece. The top nozzle is provided with a through hole, in which the connecting tube sleeve is assembled. The locking tube is accommodated in the through hole. An outer peripheral surface of the locking tube is provided with a second stopping structure, and an inner peripheral surface of the connecting tube sleeve is provided with a first stopping structure fitting the second stopping structure. The locking piece is movably arranged on the locking tube for circumferentially limiting or releasing the locking tube. A connection method using such connecting device is also provided.

6 Claims, 9 Drawing Sheets

(56) References Cited

FOREIGN PATENT DOCUMENTS

EP  3336929 A1  6/2018
KR  102264697 B1  6/2021

OTHER PUBLICATIONS

Tao Yan et al., "Design and Analysis on a Quick Linkage Mechanism", Mechanical Engineering & Automation, No. 3, Jun. 2018, pp. 84-85. 88.

* cited by examiner

QUICK-DETACHABLE CONNECTING DEVICE WITH SIMPLIFIED THREAD STRUCTURE AND CONNECTION METHOD USING SAME

CROSS-REFERENCE TO RELATED APPLICATIONS

This application claims the benefit of priority from Chinese Patent Application No. 202211182680.4, filed on Sep. 27, 2022. The content of the aforementioned application, including any intervening amendments thereto, is incorporated herein by reference in its entirety.

TECHNICAL FIELD

The present disclosure relates to nuclear fuel, and more particularly to a quick-detachable connecting device with a simplified thread structure and a connection method using the same.

BACKGROUND

The connector in the nuclear fuel assembly refers to the connecting structure between the top nozzle and the guide thimble tube, which plays a connecting role in the whole fuel assembly. Most of the existing connectors in fuel assemblies are in the form of threaded connection and expanded joint. The threaded connection has high connection strength, but it struggles with difficult disassembly and assembly. The disassembly and reassembly of nuclear fuel assemblies is carried out at 4 m below the water surface in the nuclear fuel pool, and can only be operated by machines due to the high radiation. In this case, the small size of the connectors makes the disassembly extremely difficult and time-consuming. By comparison, the expanded joint has simple disassembly operation, but the disassembly process is generally accompanied by the occurrence of waste parts, which may fall into the nuclear fuel pool. Moreover, it is not easy to treat such highly-radioactive waste parts.

SUMMARY

A purpose of this application is to provide a quick-detachable connecting device with a simplified thread structure and a connection method using the same, which can realize quick connection and disconnection, and avoid the generation of waste parts. Technical solutions of this application will be specifically described as follows.

In the first aspect, this application provides a quick-detachable connecting device with a simplified thread structure, comprising:
  a top nozzle;
  a connecting tube sleeve;
  a locking tube; and
  a locking piece;
  wherein the top nozzle is penetratedly provided with a connecting tube hole; a connecting tube sleeve is provided in the connecting tube hole; the locking tube is accommodated in the connecting tube hole; an inner circumferential surface of the connecting tube sleeve is provided with a first stopping structure; an outer circumferential surface of the locking tube is provided with a second stopping structure; the first stopping structure is matched with the second stopping structure to make the locking tube rotationally assembled in the connecting tube sleeve and limit the connecting tube sleeve in an axial direction; the locking piece is movably arranged on the locking tube, and is configured to be selectively clamped with the top nozzle to circumferentially limit the locking tube or release the locking tube.

In an embodiment, an inner circumferential surface of the connecting tube sleeve is provided with a first stopping structure, and an outer circumferential surface of the locking tube is provided with a second stopping structure; the plurality of bosses are matchedly clamped with the plurality of protrusions in one-to-one correspondence; and a width of a gap width between adjacent two bosses is larger than a width of each of the plurality of protrusions, so as to enable one of the plurality of protrusions to be removed from the gap between two adjacent bosses.

In an embodiment, each of the plurality of bosses is provided with a plurality of stopping grooves; each of the stopping grooves extends to an end of a corresponding bosses; each of the plurality of protrusions comprises a plurality of stopping raised bars; and the plurality of first stopping raised bars are correspondingly assembled in the plurality of the first stopping grooves.

In an embodiment, a top periphery of the locking piece is provided with a stopping lug protruding outward; the top nozzle is provided with a limiting groove; the limiting groove is located at a top periphery of the connecting tube hole; and the stopping lug is configured to be selectively assembled in the limiting groove.

In an embodiment, an inner circumferential of the locking tube is provided with a zigzag-shaped grooves; each side of the zigzag-shaped groove has a plurality of first peak points and a plurality of second peak points; a height of the plurality of second peak points is smaller than that of the plurality of first peak points; the plurality of first peak points and the plurality of second peak points are alternately distributed; an outer circumferential surface of the locking piece is provided with an accommodating ring grove; the accommodating ring grove is provided with a locking ball; the locking ball is partially accommodated in the zigzag-shaped groove, and is configured to be pressed by the locking piece to roll along the zigzag-shaped groove, so as to achieve switching of the locking ball between the plurality of first peak points and the plurality of second peak points; when the locking ball is located at one of the plurality of second peak points, the stopping lug is assembled in the limiting groove; and when the locking ball is located at one of the plurality of first peak points, the stopping lug is upwardly disengaged from the limiting groove.

In an embodiment, an elastic piece is provided in the locking tube, and abuts against the locking piece for providing an upward elastic force to the locking piece.

In an embodiment, the inner circumferential surface of the locking tube is also provided with a stopping ring boss; the stopping ring boss is located below the zigzag-shaped groove; and the elastic piece is arranged on the stopping ring boss, and abuts against a bottom of the locking piece.

In an embodiment, an inner wall of the connecting tube hole is also provided with a stopping groove; an outer circumferential surface of the connecting tube sleeve is provided with a stopping raised bar; the stopping raised bar is correspondingly assembled in the second stopping groove.

In an embodiment, the connecting tube sleeve is penetratedly provide with a plurality of deformation avoidance grooves, and the plurality of deformation avoidance grooves run through to an upper end face of the connecting tube sleeve.

In an embodiment, the locking tube comprises a stopping portion and a locking portion which are integrally arranged, a diameter of the stopping portion is larger than that of the locking portion, the locking portion is rotationally assembled in the connecting tube sleeve; the locking piece is movably arranged on the stopping portion, and a limiting ring boss is also arranged in the connecting tube hole, and the stopping portion abuts against the limiting ring boss.

In a second aspect, this application provides a connection method using the aforementioned quick-detachable connecting device, comprising:

assembling the connecting tube sleeve with the top nozzle;

rotatably assembling the locking tube in the connecting tube sleeve to limit the connecting tube sleeve in the axial direction; and pressing the locking piece to be engaged with the top nozzle to limit the locking tube in a circumferential direction;

wherein a detachment process is opposite to such process.

Compared to the prior art, this application has the following beneficial effects.

Regarding the quick-detachable connecting device provided herein, a connecting tube hole is penetratedly provided on a top nozzle; a connecting tube sleeve is assembled in the connecting tube hole; a locking tube is accommodated in the connecting tube hole; the inner circumferential surface of the connecting tube sleeve is provided with a first stopping structure, and an outer circumferential surface of the locking tube is provided with a second stopping structure; the first stopping structure and the second stopping structure are matched with each other, so that the locking tube can be rotationally assembled in the connecting tube sleeve, and the connecting tube sleeve can be limited in the axial direction; and the locking piece is movably arranged on the locking tube for selectively clamping with the top nozzle, so as to limit or release the locking tube in the circumferential direction. In the practical assembly, the connecting tube sleeve can first be assembled with the top nozzle, and then rotationally loaded into the locking tube. Through the cooperation of the first stopping structure and the second stopping structure, the locking tube can fix the connecting tube sleeve, and then the locking piece is pressed to be clamped to the top nozzle to realize the circumferential limit of the locking tube, thereby avoiding the rotation and loosening of the locking tube and ensuring the fixed limit between the locking tube and the connecting tube sleeve. In the detachment process, it is only needed to press the locking piece to be disengaged from the top nozzle, so that the locking piece is separated from the top nozzle, and the circumferential limitation on the locking tube can be eliminated. Then the locking tube is rotated and withdrawn to release the connecting tube sleeve, so that the top nozzle can be easily removed, allowing for easy detachment. Compared with the prior art, the quick-detachable connecting device provided herein uses the first stopping structure and the second stopping structure to simplify the thread structure, and realizes the limit between the locking tube and the connecting tube sleeve to ensure the fixing effect. Meanwhile, the unlocking and locking can be realized by pressing the locking piece, allowing for easy disassembly and assembly and avoiding the occurrence of waste parts.

DESCRIPTION OF THE DRAWINGS

In order to illustrate the technical solutions of the embodiments of the present disclosure more clearly, the drawings needed in the embodiments will be briefly described below. It should be understood that the following drawings only illustrate some embodiments of the present disclosure and therefore should not be considered as limiting the scope of the disclosure. For those skilled in the art, other related drawings can be obtained according to these drawings without any creative effort.

In the drawings: 100-quick-detachable connecting device; 110-top nozzle; 111-connecting tube hole; 113-limiting groove; 115-second stopping groove; 117-limiting ring boss; 130-connecting tube sleeve; 131-boss; 133-first stopping groove; 135-second stopping raised bar; 137-deformation avoidance groove; 150-locking tube; 150a-stopping portion; 150b-locking portion; 151-protrusion; 153-first stopping raised bar; 155-zigzag-shaped groove; 157-high peak point; 158-stopping ring boss; 159-low peak point; 170-locking piece; 171-stopping lug; 173-accommodating ring groove; 175-locking ball; and 177-elastic piece.

DETAILED DESCRIPTION OF EMBODIMENTS

In order to illustrate the objects, technical solutions and advantages of the embodiments of this application more clearly, the technical solutions in the embodiments of this application will be clearly and completely described below with reference to the drawings and embodiments of this application. It is obvious that described below are only some embodiments, instead of all embodiments, of this application. The components of embodiments of the present disclosure described and illustrated in the accompanying drawings herein can be arranged and designed with a variety of configurations.

Therefore, the following detailed description of embodiments in the accompanying drawings is not intended to limit the scope of the claimed disclosure, but merely represents selected embodiments of the disclosure. Based on the embodiments provided herein, all other embodiments obtained by those skilled in the art without making creative effort shall fall within the scope of the present disclosure.

It should be noted that similar labels and letters indicate similar items in the following drawings. Therefore, once an item has been defined in a drawing, there is no need to further define and explain it in the subsequent drawings.

As used herein, it should be noted that the orientation or position relationship indicated by the terms "center", "up", "down", "left", "right", "vertical", "horizontal", "inside", "outside" is based on the orientation or position relationship shown in the drawings, or the orientation or position relationship normally placed when used. These terms are only for the convenience of describing and simplifying the description of this application, rather than indicating or implying that the device or element referred to must have a specific orientation, or must be constructed and operate in a specific orientation. Therefore, it cannot be understood as a limitation of the present disclosure. In addition, the terms "first", "second", and "third" are only used for distinguishment and cannot be understood as indicating or implying relative importance.

In addition, the terms "horizontal", "vertical", etc., do not mean that the components are required to be absolutely horizontal or vertical, but may be slightly inclined. For example, "horizontal" simply means that the orientation is more horizontal in relation to "vertical" and does not mean that the structure must be perfectly horizontal, but may be slightly inclined.

As used herein, it should also be noted that, unless otherwise expressly defined and specified, the terms "arrangement", "installation", "connection", and "linkage" should be understood in a broad sense. For example, it can be fixed connection, detachable connection or integrated connection; it can be mechanical connection or electrical connection; it can be direct connection or indirect connection through intermediate media, or can be the internal communication of two components. For those of ordinary skill in the art, the meanings of the above terms in this application can be understood in specific circumstances.

Referring to FIG. 1 to FIG. 9, this embodiment provides a quick-detachable connecting device 100 with a simplified thread structure that enables rapid assembly and disassembly while avoiding the generation of discarded parts.

Figure 1:
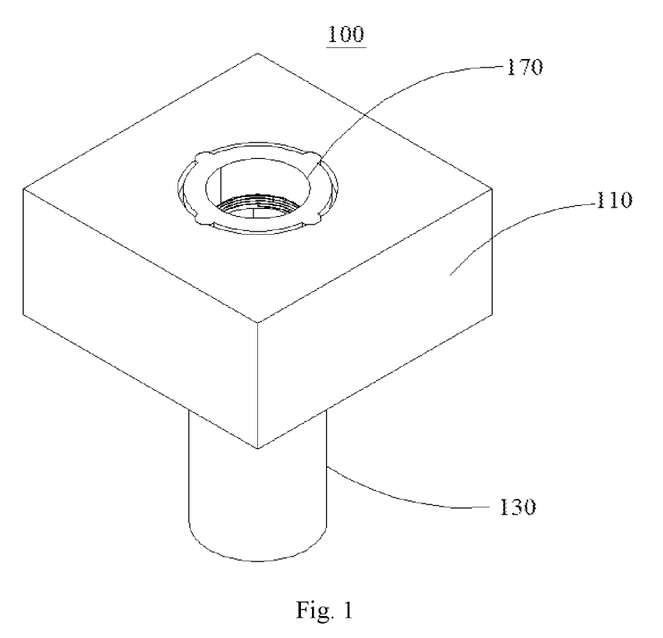
FIG. 1 is a structural diagram of a quick-detachable connecting device with a simplified thread structure according to an embodiment of this application.
Figure 2:
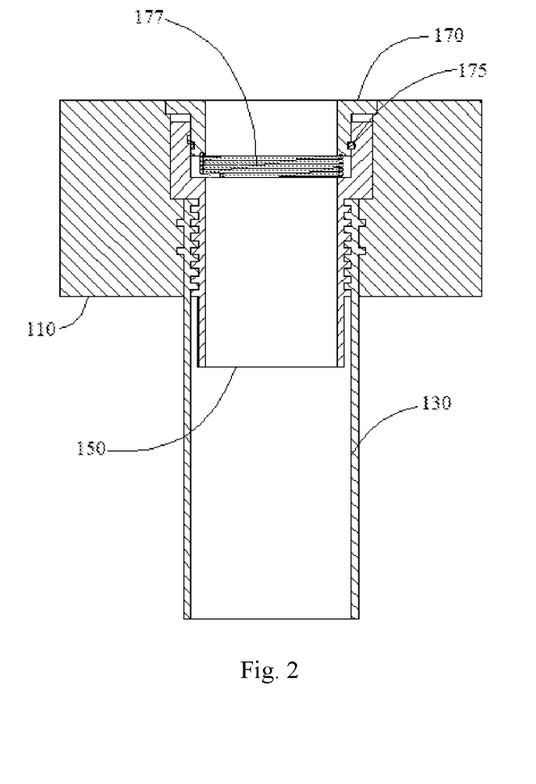
FIG. 2 is a sectional view of an internal structure of the quick-detachable connecting device according to an embodiment of this application.

The quick-detachable connecting device 100 includes a top nozzle 110, a connecting tube sleeve 130, a locking tube 150 and a locking piece 170. The top nozzle 110 is provided with a connecting tube hole 111, in which the connecting tube sleeve 130 is assembled. The locking tube 150 is accommodated in the connecting tube hole 111. An inner circumferential surface of the connecting tube sleeve 130 is provided with a first stopping structure, and an outer circumferential surface of the locking tube 150 is provided with a second stopping structure. The first stopping structure is matched with the second stopping structure to make the locking tube 150 rotationally assembled in the connecting tube sleeve 130 and limit the connecting tube sleeve 130 in an axial direction. The locking piece 170 is movably arranged on the locking tube 150, and is configured to be selectively clamped with the top nozzle 110 to circumferentially limit the locking tube 150 or release the locking tube 150.

In this embodiment, the locking piece 170 can be pressed to hold and disengage the top nozzle 110. In practical assembly, the connecting tube sleeve 130 can first be assembled with the top nozzle 110, and then rotationally loaded into the locking tube 150. Through the cooperation of the first stopping structure and the second stopping structure, the locking tube 150 can fix the connecting tube sleeve 130, and then the locking piece 170 is pressed to be clamped to the top nozzle 110 to realize the circumferential limit of the locking tube 150, thereby avoiding the rotation and loosening of the locking tube and ensuring the fixed limit between the locking tube 150 and the connecting tube sleeve 130. In the detachment process, it is only needed to press the locking piece to be disengaged from the top nozzle 110, so that the pressing locking piece is separated from the top nozzle 110, and the circumferential limitation on the locking tube 150 can be eliminated. Then the locking pipe is rotated and withdrawn to release the connecting tube sleeve 130, so that the top nozzle 110 can be easily removed, allowing for easy detachment.

Figure 3:
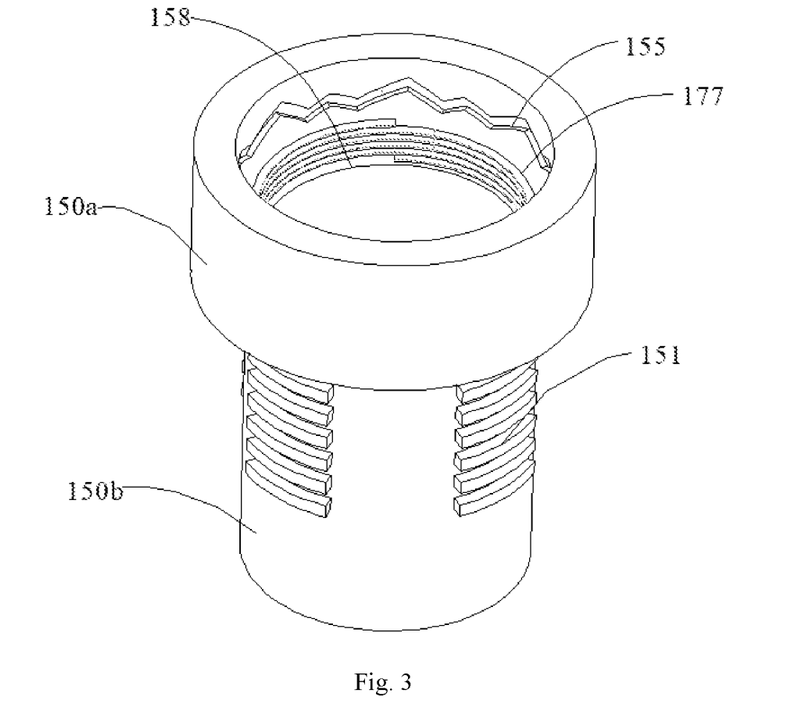
FIG. 3 is a structural diagram of a locking tube in FIG. 2.
Figure 5:
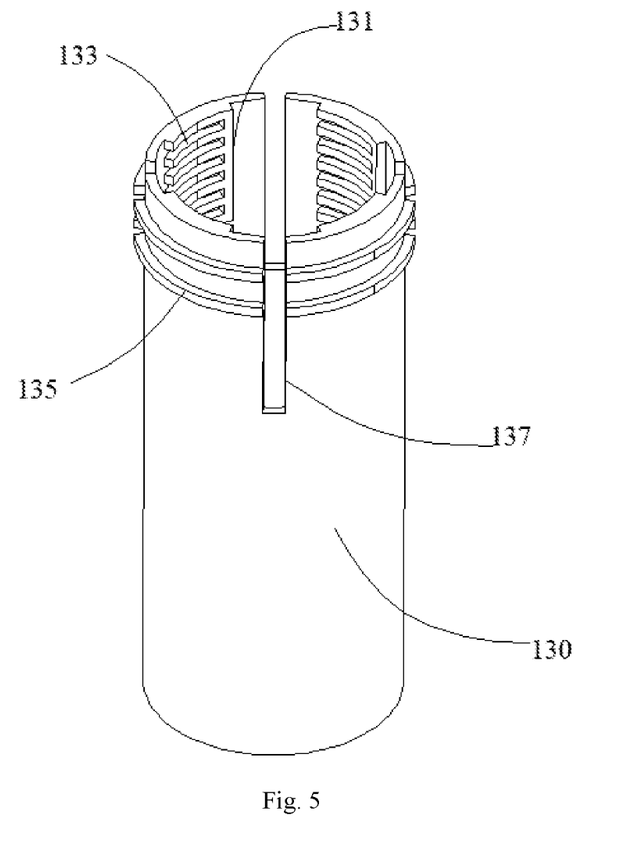
FIG. 5 is a structural diagram of a connecting tube sleeve in FIG. 2.
Figure 6:
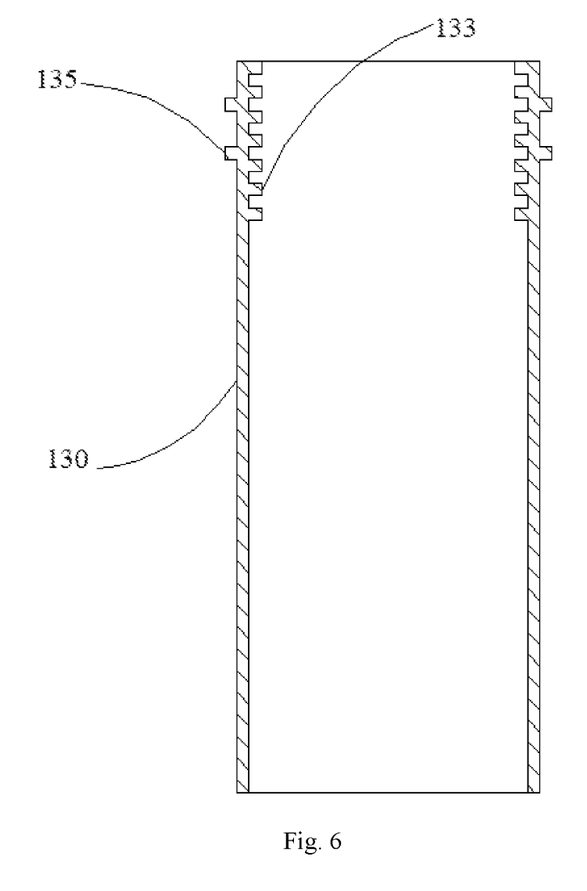
FIG. 6 is a sectional view of the connecting tube sleeve of FIG. 2.

In this embodiment, the first stopping structure includes a plurality of bosses 131 arranged spaced apart. The second stopping structure includes a plurality of protrusions 151 arranged spaced apart. The plurality of bosses 131 are matchedly clamped with the plurality of protrusions 151 in one-to-one correspondence. A width of a gap between adjacent two bosses 131 is larger than a width of each of the plurality of protrusions 151, so as to enable one of the plurality of protrusions 151 to be removed from the gap between two adjacent bosses 131. Specifically, when inserting the locking tube 150, a plurality of protrusions 151 can be inserted along the gap between the bosses 131, and then the locking piece can be rotated so that the bosses 131 and the protrusions 151 are conveniently clamped together.

It is noteworthy that the number of the boss 131 can be four, and the four bosses 131 are distributed spaced apart on the inner circumferential surface of the connecting tube sleeve 130. The number of the protrusion 151 also can be four, and the four protrusions 151 are distributed spaced apart on the outer circumferential surface of the locking tube 150.

In this embodiment, each of the plurality of bosses 131 is provided with a plurality of stopping grooves 133. Each of the first stopping grooves 133 extends to an end of a corresponding bosses 131. Each of the plurality of protrusions 151 includes a plurality of stopping raised bars 153. The plurality of the stopping raised bars 153 are correspondingly assembled in the plurality of the first stopping grooves 133. Specifically, the plurality of first stopping grooves 133 on the same boss 131 are arranged parallel to each other, and each first stopping groove 133 is semi-open, and the plurality of first stopping grooves 133 are all connected to the same end of the boss 131, forms a stopping structure at the other end of the first stopping groove 133, which is convenient for abutting against a plurality of first stopping raised bars 153. In practical assembly, during the process of rotating the locking ring, a plurality of first stopping raised bars 153 are correspondingly fitted into a plurality of first stopping grooves 133, and are held against the end of the first stopping grooves 133 after being rotated in place, so as to rotate into place, and realize the fixing between the locking piece and the connecting tube sleeve 130.

In other preferred embodiments of the present application, the boss 131 and the protrusion 151 can also realize mutual position-limitation through hooks and slots, and the limiting method is not specifically limited here.

It should be noted that, in this embodiment, the first stopping groove 133 and the plurality of first stopping raised bars 153 can be used to replace the screw structure in the conventional technology, and only need to rotate ¼ turn to realize mutual assembly and disassembly of the room is very fast and convenient. Each first stopping groove 133 has an open end and a closed end, and the first stopping raised bar 153 is loaded into the first stopping groove 133 from the open end, and abuts against the closed end, facilitating the matching of the open end with the first stopping protrusion 151 on the locking tube 150, and the rotational positioning of the closed end.

Figure 7:
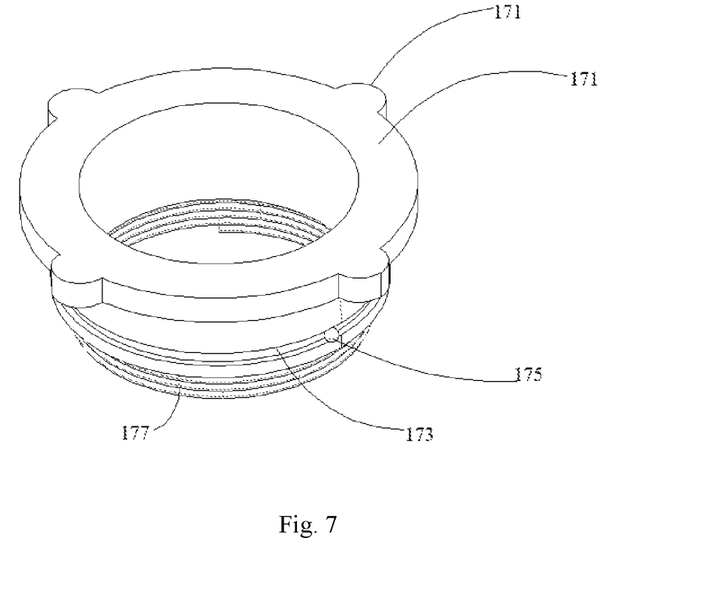
FIG. 7 is a structural diagram of a locking piece in FIG. 2.
Figure 8:
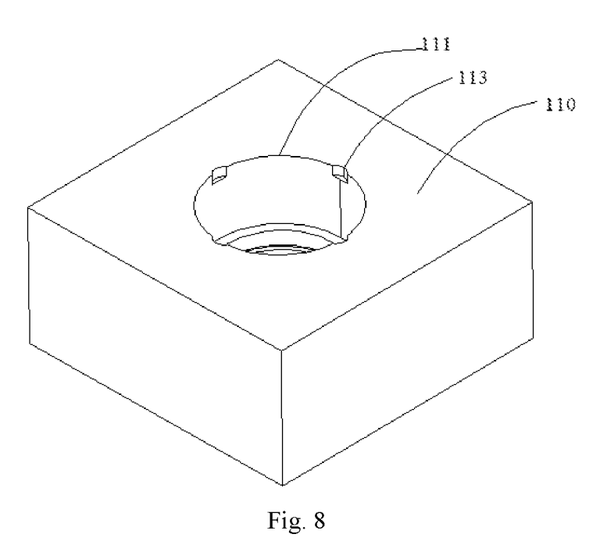
FIG. 8 is a structural diagram of a top nozzle in FIG. 2.

In this embodiment, the top periphery of the locking piece 170 is also provided with a stopping lug 171 protruding outward, and the top nozzle 110 is provided with a limiting groove 113. The limiting groove 113 is located at the top periphery of the connecting tube hole 111, and the stopping lug 171 is configured to be selectively assembled in the limiting groove 113. Specifically, the locking piece 170 is fixed in the circumferential direction through the cooperation of the stopping lugs 171 and the limiting grooves 113, preventing it from rotating back, and avoiding the locking piece from falling out of the connecting tube sleeve 130. Preferably, the stopping lug 171 and the limiting groove 113 are both 4, the 4 stopping lugs 171 are uniformly distributed on the circumferential rim of the locking piece 170, and the 4 limiting grooves 113 are connected to the connecting tube hole 111 and located at the edge of the connecting tube hole 111.

Figure 4:
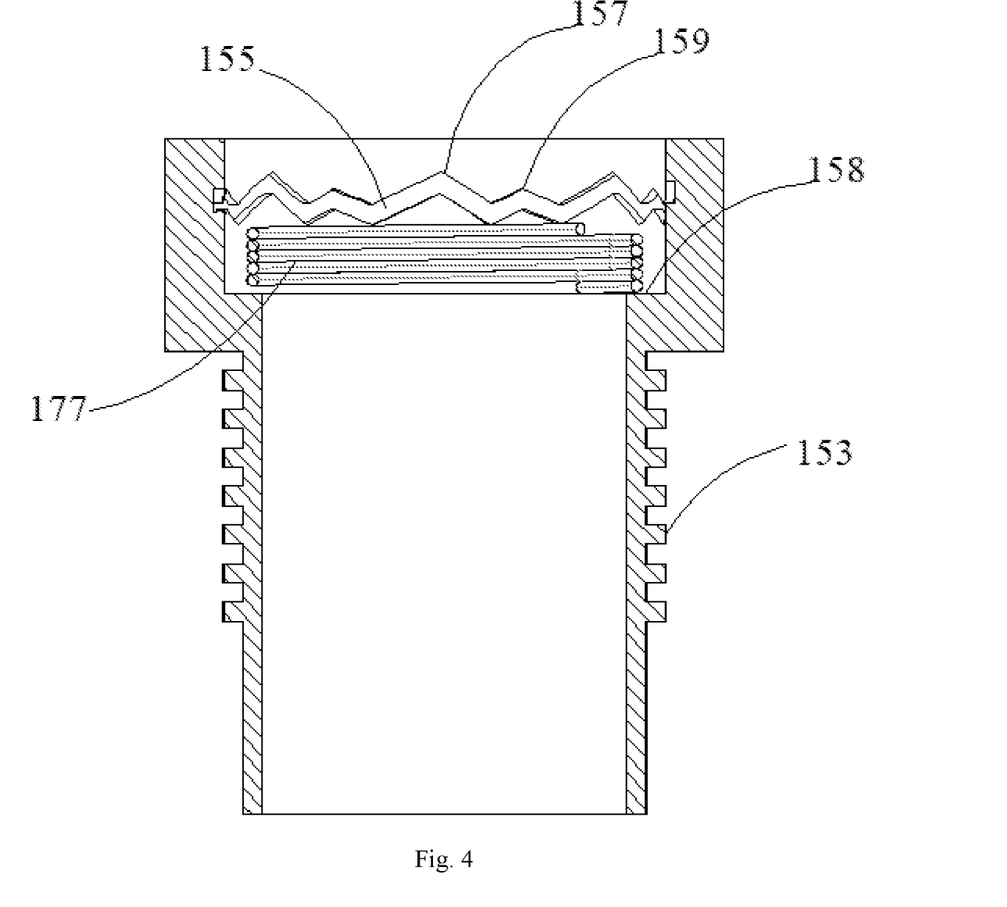
FIG. 4 is a sectional view of the locking tube of FIG. 2.

In this embodiment, an inner circumferential surface of the locking tube 150 is provided with a zigzag-shaped groove; each side of the zigzag-shaped groove has a plurality of first peak points and a plurality of second peak points; a height of the plurality of second peak points is smaller than that of the plurality of first peak points; and the plurality of first peak points and the plurality of second peak points are alternately distributed. An outer circumferential surface of the locking piece 170 is provided with an accommodating ring groove 173, and the accommodating ring groove 173 is provided with a locking ball 175, the locking ball 175 is partially accommodated in the zigzag-shaped grooves 155, and is configured to be pressed by the locking piece to roll along the zigzag-shaped grooves 155 driven by the pressing action of the locking piece 170, so as to achieve switching of the locking ball 175 between the plurality of first peak points 157 and the plurality of second peak points 159; when the locking ball 175 is located at one of the plurality of second peak points 155, the stopping lug 171 is assembled in the limiting groove 113; and when the locking ball 175 is located at one of the plurality of high peak points 157, the stopping lug 171 is upwardly disengaged from the limiting groove 113. Specifically, the zigzag-shaped grooves 155 are distributed in a serrated shape on the inner circumferential surface of the locking tube 150, the locking ball 175 is partially embedded in the zigzag-shaped grooves 155 and partially embedded in the accommodating ring grooves 173, preferably one half of the locking ball 175 is embedded in the zigzag-shaped grooves 155, and the other half is embedded in the accommodating ring grooves 173, and the accommodating ring grooves 173 are distributed in a flat annular shape on the outer circumferential surface of the locking piece 170, so that when the locking piece 170 is pressed up and down to move, so as to change the height of the locking ball 175 and adjust the height of the locking piece 170.

It should be noted that, in the present embodiment, the high peak point 157 and the low peak point 159 all refer to different apexes of the zigzag-shaped grooves 155, the high peak point 157 and the low peak point 159 are alternately arranged, and the high peak point 157 and the low peak point 159 are one of the bending apexes of the zigzag-shaped grooves 155, and there is a certain height difference between the high peak point 157 and the low peak point 159, which should be greater than the depth of the limiting groove 113, when the locking ball 175 is located at the high peak point 157, the stopping lug 171 escapes from the limiting groove 113, and when the locking ball 175 is at the low peak point 159, the stopping lug 171 is inserted into the limiting groove 113.

In this embodiment, an elastic piece 177 is provided in the connecting tube sleeve 130, and abuts against the locking piece 170 for providing upward elastic force to the locking piece 170. Specifically, the inner circumferential surface of the connecting tube sleeve 130 also provides a stopping ring boss 158, and the stopping ring boss 158 is located on the lower side of the zigzag-shaped groove 155. The elastic piece 177 is arranged on the stopping ring boss 158, and is held against the bottom of the locking piece 170. The elastic piece 177 can be a spring, and the spring is arranged on the stopping ring boss 158, and is held against the bottom of the locking piece 170. When the locking piece 170 is pressed, the locking ball 175 moves downwardly and reverts by a spring against the locking piece 170 after being pressed down to a low point, allowing the locking ball 175 to return to either a high peak point 157 or a low peak point 159. For example, when the locking ball 175 is located at the high peak point 157, the pressing locking piece 170 causes the locking ball 175 to descend to a low point along the zigzag-shaped grooves 155, and then the pressing is removed, and the locking will be bounced upwardly under the elastic force of the spring, so that the locking ball 175 rises up along the zigzag-shaped grooves 155 to the low peak point 159 adjacent to the high peak point 157, and at this time, the stopping lugs 171 on the locking piece 170 are fitted in the limiting grooves 113 to complete the locking. When unlocking, it is only necessary to press the locking piece 170 again.

Figure 9:
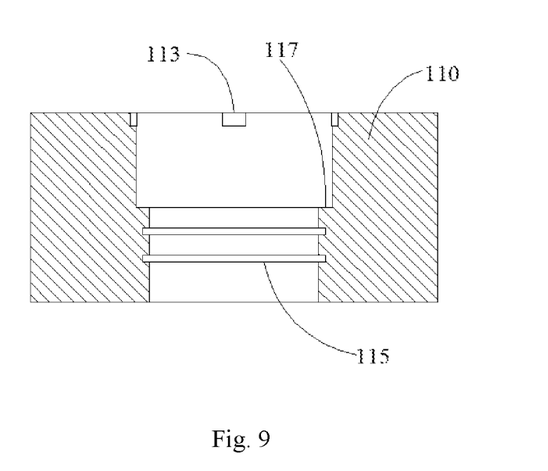
FIG. 9 is a sectional view of the top nozzle of FIG. 2.

In this embodiment, the locking tube 150 includes a stopping portion 150a and a locking portion 150b integrally provided, the diameter of the stopping portion 150a is larger than the diameter of the locking portion 150b, and the locking portion 150b is rotatably fitted in the connecting tube sleeve 130, the locking piece 170 is movably disposed on the stopping portion 150a, and a limiting ring boss 117 is also provided in the connecting tube hole 111, and the stopping portion 150a abuts against the limiting ring boss 117. Specifically, by providing the limiting ring boss 117, it is possible to limit the loading depth of the locking tube 150, so as to ensure that the first stopping raised bar 153 on the locking tube 150 can be precisely matched and aligned with the first stopping groove 133 on the connecting tube sleeve 130. The zigzag-shaped grooves 155 are also provided at the stopping portion 150a.

In this embodiment, an inner wall of the connecting tube hole 111 is further provided with a second stopping groove 115, and the outer peripheral surface of the connecting tube sleeve 130 is also provided with a second stopping raised bar 135, the second stopping raised bar 135 corresponds to fitted in the second stopping groove 115. Specifically, there are multiple second stopping raised bar 135 and second stopping grooves 115, and through the cooperation between the second stopping raised bar 135 and the second stopping grooves 115, the connecting tube sleeve 130 can be realized. The cooperation and fixing with the top nozzle 110 further ensure the fixing of the connecting tube sleeve 130.

In this embodiment, a plurality of deformation avoidance grooves 137 are formed through the connection sleeve 130, and the plurality of deformation avoidance grooves 137 run through to an upper surface of the connecting tube sleeve 130. Specifically, there are four deformation avoidance grooves 137, and the four deformation avoidance grooves 137 are evenly distributed, and the end of the connecting tube sleeve 130 is divided into four petals, and the outer part of each petal is provided with a second stopping raised bar 135, by providing the deformation avoidance groove 137, the end of the connecting tube sleeve 130 can be deformed to a certain extent, so that it can be quickly removed from the top nozzle 110 under the action of external force.

This embodiment also provides a connection method using a thread-based quick-detachable connecting device. The method includes the following steps: the connecting tube sleeve is first assembled with the top nozzle; then the locking tube is rotatably fitted in the connecting tube sleeve to limit the axial direction of the connecting tube sleeve; finally, press the locking piece to be engaged with the top nozzle to limit the locking tube in the circumferential direction; a detachment process is opposite to such process.

The working principle of the thread simplified quick detachable connecting device 100 provided in this embodiment is as follows:

First, assemble the connecting tube sleeve 130 with the top nozzle 110, and then put the second stopping raised bar 135 on the connecting tube sleeve 130 into the second stopping groove 115 under the action of external force to achieve preliminary positioning, and then put it into the locking tube 150, the locking tube 150 is first inserted into the connecting tube sleeve 130 downwards, and then the locking tube 150 is rotated clockwise, so that the first stopping raised bar 153 on the locking tube 150 is fitted into the first stopping groove 133, realizing locking tighten the fixation between the tube 150 and the connecting tube sleeve 130, and then press the locking piece to be in the low position and the stopping lug 171 is installed into the limiting groove 113, completing the limit in the circumferential direction and completing the locking action. In the disassembly process, firstly press the locking piece 170 so that the stopping lug 171 escapes from the limiting groove, and the rest of the process is opposite to the installation process.

This embodiment simplifies the conventional threaded connection, and replaces the original threaded connection with a stopping groove and a stopping raised bar, the first stopping raised bar 153 on the locking tube 150 and the first stopping grooves 133 on the connecting tube sleeve 130 are staggeringly assembled, and then the locking tube 150 is rotated clockwise until it cannot be screwed. At this time, the first stopping raised bar 153 on the locking tube 150 is against the closed end of the first stopping groove 133, thus realizing the function similar to threaded connection. In order to prevent the locking tube 150 from rotating during vibration, the circumferential restriction can be realized by pressing the locking piece 170. When the locking piece 170 is pressed once, the four stopping lugs 171 of the locking piece 170 are fitted into the limiting grooves 113 on the top nozzle 110 to limit its circumferential rotation, thereby realizing a tight connection. When dismounting, the locking piece 170 is pressed to pop up, and the locking tube 150 can be loosened in a direction opposite to the installation direction.

To sum up, this embodiment provided a quick-detachable connecting device 100, in which a connecting tube hole 111 is penetratedly provided on a top nozzle 110, a connecting tube sleeve 130 is assembled in the connecting tube hole 111, a locking tube 150 is accommodated in the connecting tube hole 111, and an outer circumferential surface of the locking tube 150 is provided with a second stopping structure, the inner circumferential surface of the connecting tube sleeve 130 is provided with a first stopping structure, the first stopping structure and the second stopping structure with each other, so that the locking tube 150 can be rotationally assembled in the connecting tube sleeve 130, and the connecting tube sleeve 130 can be limited in the axial direction; and the locking piece 170 is movably arranged on the locking tube 150 for selectively clamping with the top nozzle 110, so as to limit or release the limiting of the locking tube 150 in the circumferential direction. In practical assembly, the connecting tube sleeve 130 can first be assembled with the top nozzle 110, and then rotationally loaded into the locking tube 150. Through the cooperation of the first stopping structure and the second stopping structure, the locking tube 150 can fix the connecting tube sleeve 130, and then the locking piece 170 is pressed to be clamped to the top nozzle 110 to realize the circumferential limit of the locking tube 150, thereby avoiding the rotation and loosening of the locking tube and ensuring the fixed limit between the locking tube 150 and the connecting tube sleeve 130. In the detachment process, it is only needed to press the locking piece to be disengaged from the top nozzle 110, so that the pressing locking piece is separated from the top nozzle 110, and the circumferential limitation on the locking tube 150 can be eliminated. Then the locking pipe is rotated and withdrawn to release the connecting tube sleeve 130, so that the top nozzle 110 can be easily removed, allowing for easy detachment. Compared with the prior art, the quick-detachable connecting device 100 provided herein uses the first stopping structure and the second stopping structure to simplify the thread structure, and realizes the limit between the locking tube 150 and the connecting tube sleeve 130, to ensure the fixing effect. Meanwhile, the unlocking and locking can be realized by pressing the locking piece, allowing for easy disassembly and assembly, and avoiding the occurrence of waste parts.

Described above are only preferred embodiments of the present disclosure, and are not intended to limit this disclosure. It should be understood that though the disclosure has been described in detail above, various modifications, replacements and changes can still be made by those skilled in the art. Those modifications, replacements, improvements, etc., made without departing from the spirit of the present disclosure shall be included within the scope of this disclosure defined by the appended claims.

What is claimed is:

1. A quick-detachable connecting device, comprising:
   a top nozzle;
   a connecting tube sleeve;
   a locking tube; and
   a locking piece;
   wherein the top nozzle is penetratedly provided with a connecting tube hole; the connecting tube sleeve is provided in the connecting tube hole; the locking tube is accommodated in the connecting tube hole; an inner circumferential surface of the connecting tube sleeve is provided with a first stopping structure; an outer circumferential surface of the locking tube is provided with a second stopping structure; the first stopping structure is matched with the second stopping structure to make the locking tube rotationally assembled in the connecting tube sleeve and limit the connecting tube sleeve in an axial direction; the locking piece is movably arranged on the locking tube, and is configured to be selectively clamped with the top nozzle to circumferentially limit the locking tube or release the locking tube;
   a top periphery of the locking piece is provided with a stopping lug protruding outward; the top nozzle is provided with a limiting groove; the limiting groove is located at a top periphery of the connecting tube hole; and the stopping lug is configured to be selectively assembled in the limiting groove;
   an inner circumferential surface of the locking tube is provided with a zigzag-shaped groove; each side of the zigzag-shaped groove has a plurality of first peak points and a plurality of second peak points; a height of the plurality of second peak points is smaller than that of the plurality of first peak points; the plurality of first peak points and the plurality of second peak points are alternately distributed; an outer circumferential surface of the locking piece is provided with an accommodating ring groove; the accommodating ring groove is provided with a locking ball; the locking ball is partially accommodated in the zigzag-shaped groove, and is configured to be pressed by the locking piece to roll along the zigzag-shaped groove, so as to achieve switching of the locking ball between the plurality of first peak points and the plurality of second peak points; when the locking ball is located at one of the plurality of second peak points, the stopping lug is assembled in the limiting groove; and when the locking ball is located at one of the plurality of first peak points, the stopping lug is upwardly disengaged from the limiting groove;

an elastic piece is provided in the locking tube, and abuts against the locking piece for providing an upward elastic force to the locking piece; and the inner circumferential surface of the locking tube is also provided with a stopping ring boss; the stopping ring boss is located below the zigzag-shaped groove; and the elastic piece is arranged on the stopping ring boss, and abuts against a bottom of the locking piece.

2. The quick-detachable connecting device of claim 1, wherein the first stopping structure comprises a plurality of bosses arranged spaced apart; the second stopping structure comprises a plurality of protrusions arranged spaced apart; the plurality of bosses are matchedly clamped with the plurality of protrusions in one-to-one correspondence; and a width of a gap between adjacent two bosses is larger than a width of each of the plurality of protrusions, so as to enable one of the plurality of protrusions to be removed from the gap between two adjacent bosses.

3. The quick-detachable connecting device of claim 2, wherein each of the plurality of bosses is provided with a plurality of stopping grooves; each of the stopping grooves extends to an end of a corresponding boss; each of the plurality of protrusions comprises a plurality of stopping raised bars; and the plurality of stopping raised bars are correspondingly assembled in the plurality of stopping grooves.

4. The quick-detachable connecting device of claim 1, wherein an inner wall of the connecting tube hole is provided with a stopping groove; an outer circumferential surface of the connecting tube sleeve is provided with a stopping raised bar; the stopping raised bar is correspondingly assembled in the stopping groove; the connecting tube sleeve is penetratedly provided with a plurality of deformation avoidance grooves; and the plurality of deformation avoidance grooves run through to an upper end face of the connecting tube sleeve.

5. The quick-detachable connecting device of claim 1, wherein the locking tube comprises a stopping portion and a locking portion which are integrally arranged; a diameter of the stopping portion is larger than that of the locking portion; the locking portion is rotationally assembled in the connecting tube sleeve; the locking piece is movably arranged on the stopping portion; and a limiting ring boss is arranged in the connecting tube hole, and the stopping portion abuts against the limiting ring boss.

6. A connection method using the thread based quick-detachable connecting device of claim 1, comprising:
assembling the connecting tube sleeve with the top nozzle;
rotatably assembling the locking tube in the connecting tube sleeve to limit the connecting tube sleeve in an axial direction; and
pressing the locking piece to be engaged with the top nozzle to limit the locking tube in a circumferential direction.

* * * * *